(12) United States Patent
Chapman (10) Patent No.: US 11,390,102 B1
(45) Date of Patent: Jul. 19, 2022

(54) DUAL GLOSS AND FLUORESCENT EFFECTS IN THE SAME SPACE

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/349,329

(22) Filed: Jun. 16, 2021

(51) Int. Cl.
  *H04N 1/60* (2006.01)
  *B41M 3/14* (2006.01)
  *H04N 1/32* (2006.01)

(52) U.S. Cl.
  CPC ........ *B41M 3/144* (2013.01); *H04N 1/32309* (2013.01); *H04N 1/6022* (2013.01); *H04N 1/6097* (2013.01)

(58) Field of Classification Search
  CPC . B41M 3/144; H04N 1/32309; H04N 1/6022; H04N 1/6097
  See application file for complete search history.

(56) References Cited

U.S. PATENT DOCUMENTS

| | | | |
|---|---|---|---|
| 3,763,356 A * | 10/1973 | Berler | G06K 19/02 250/365 |
| 9,444,969 B2 | 9/2016 | Miller et al. | |
| 9,751,355 B2 * | 9/2017 | Schaede | B42D 25/387 |
| 9,781,294 B1 | 10/2017 | Chapman | |
| 10,999,466 B1 | 5/2021 | Chapman | |
| 11,006,021 B1 | 5/2021 | Ireland et al. | |
| 2008/0259400 A1 * | 10/2008 | Hersch | B41M 3/144 358/2.1 |
| 2010/0140501 A1 * | 6/2010 | Lawandy | H04L 9/3278 250/459.1 |
| 2013/0127151 A1 * | 5/2013 | Sekine | B42D 25/29 428/29 |
| 2015/0269703 A1 | 9/2015 | Chapman | |
| 2015/0271364 A1 | 9/2015 | Chapman et al. | |

(Continued)

FOREIGN PATENT DOCUMENTS

| | | | | |
|---|---|---|---|---|
| CN | 108538187 A | * | 9/2018 | ............. B41M 3/14 |
| FR | 3018730 A1 | * | 9/2015 | ............ B41M 3/144 |

(Continued)

OTHER PUBLICATIONS

"Fraud-Resistant Effects That Protect Your Most Sensitive Documents", 2019 Xerox Corporation.

*Primary Examiner* — Ted W Barnes
(74) *Attorney, Agent, or Firm* — Ortiz & Lopez, PLLC; Luis M. Ortiz; Kermit D. Lopez (57) ABSTRACT

A method, system, and apparatus for rendering a security mark on a recording medium can involve creating a metameric pair of fluorescent inks with a first fluorescent ink among the metameric pair of fluorescent inks that blocks UV light and a second fluorescent ink among the metameric pair of fluorescent inks that does not block UV light, configuring at least one fluorescent ink among the metameric pair of fluorescent inks with a first pattern based on a constant pixel high surface and at least one other fluorescent ink among the metameric pair of fluorescent inks with a second pattern based on a substantial amount of white space, and defining a security mark for rendering on a recording medium with the metameric pair of fluorescent inks and based on the first pattern and the second pattern.

20 Claims, 9 Drawing Sheets

(56) References Cited

U.S. PATENT DOCUMENTS

| | | | |
|---|---|---|---|
| 2015/0275075 A1* | 10/2015 | Dain | H01B 1/04 |
| | | | 428/452 |
| 2016/0121639 A1* | 5/2016 | Schaede | B41M 3/144 |
| | | | 283/85 |
| 2017/0150000 A1* | 5/2017 | Chapman | H04N 1/6008 |
| 2020/0218953 A1* | 7/2020 | Pohjola | G06K 19/06103 |

FOREIGN PATENT DOCUMENTS

| | | | | | |
|---|---|---|---|---|---|
| JP | 2007069552 A | * | 3/2007 | | |
| WO | WO-2009083570 A1 | * | 7/2009 | | B42D 25/29 |
| WO | WO-2012020692 A1 | * | 2/2012 | | B42D 25/29 |

* cited by examiner

DUAL GLOSS AND FLUORESCENT EFFECTS IN THE SAME SPACE

TECHNICAL FIELD

Embodiments are related to image processing methods, systems and devices. Embodiments also relate to printing devices and techniques. Embodiments further relate to security features such as watermarks. Embodiments are further related to specialty imaging effects used in the creation and rendering of security marks.

BACKGROUND

Protecting sensitive documents from unauthorized duplication is a growing concern. Counterfeit copies of documents such as coupons, tickets, and invoices can result in serious financial impacts. This concern can be addressed with fraud-resistant specialty imaging effects for static and variable jobs, which can add an extra level of security and authentication.

In conventional printing processes that may require security measures, a pattern color space having specialty imaging characteristics has been utilized to provide security measures and prevent counterfeiting of printed materials. Furthermore, in conventional printing processes, a pattern color space has been utilized, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that can prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples are in prescriptions, contracts, documents, coupons, and tickets. Typically, several specialty-imaging techniques are used at various positions in a document. In addition, these security elements may in some cases conflict with the overall aesthetics of the document.

Some security printing effects used in the creation of security marks (e.g., watermarks) may be difficult to verify under certain lighting conditions. For example, gloss effects are difficult to detect under low lighting conditions such as after dark. Fluorescent effects are difficult to detect under bright lighting conditions such as sunlight. Some solutions may involve using both effects on a security document and verifying the correct effect for the current lighting. These solutions, however, take up more real estate/space on the security document.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image processing methods, systems and devices.

It is another aspect of the disclosed embodiments to provide for a method, system and apparatus for configuring and rendering security marks used for securing documents.

It also an aspect of the disclosed embodiments to provide for methods, systems and devices for creating specialty-imaging effects used for security marks.

It is a further aspect of the disclosed embodiments that provide for methods, systems and devices for creating specialty-imaging effects for security marks that take up less space or 'real estate' on the rendered document incorporating the security mark.

The aforementioned aspects and other objectives and advantages can now be achieved as described herein. In an embodiment, a method for rendering a security mark on a recording medium, can involve: creating a metameric pair of fluorescent inks with a first fluorescent ink among the metameric pair of fluorescent inks that blocks UV light and a second fluorescent ink among the metameric pair of fluorescent inks that does not block UV light, configuring at least one fluorescent ink among the metameric pair of fluorescent inks with a first pattern based on a constant pixel high surface and at least one other fluorescent ink among the metameric pair of fluorescent inks with a second pattern based on a substantial amount of white space, and defining a security mark for rendering on a recording medium with the metameric pair of fluorescent inks and based on the first pattern and the second pattern.

In an embodiment, an apparatus for rendering a security mark on a recording medium, can include: a metameric pair of fluorescent inks created with a first fluorescent ink among the metameric pair of fluorescent inks that blocks UV light and a second fluorescent ink among the metameric pair of fluorescent inks that does not block UV light; at least one fluorescent ink among the metameric pair of fluorescent inks configured with a first pattern based on a constant pixel high surface and at least one other fluorescent ink among the metameric pair of fluorescent inks with a second pattern based on a substantial amount of white space; and a security mark defined for rendering on a recording medium with the metameric pair of fluorescent inks and based on the first pattern and the second pattern.

In an embodiment, a system for rendering a security mark on a recording medium, can include at least one processor and a non-transitory computer-usable medium embodying computer program code, the computer-usable medium capable of communicating with the at least one processor, the computer program code comprising instructions executable by the at least one processor and configured for: creating a metameric pair of fluorescent inks with a first fluorescent ink among the metameric pair of fluorescent inks that blocks UV light and a second fluorescent ink among the metameric pair of fluorescent inks that does not block UV light; configuring at least one fluorescent ink among the metameric pair of fluorescent inks with a first pattern based on a constant pixel high surface and at least one other fluorescent ink among the metameric pair of fluorescent inks with a second pattern based on a substantial amount of white space; and defining a security mark for rendering on a recording medium with the metameric pair of fluorescent inks and based on the first pattern and the second pattern.

An embodiment can further involve verifying the security mark by confirming that the security mark: exhibits a gloss effect when subject to tilting under a non ultra-violet light; exhibits a fluorescent effect under an ultra-violet light; and exhibits the gloss effect and the fluorescent effect in a same space.

An embodiment can further involve: defining the first pattern based on the constant pixel high surface by defining the first pattern based on a percentage of CMYK that is one pixel high or defining the first pattern based on the pixel high surface that is a percentage of RGB that is two pixels high, and defining the second pattern using a lesser sensitive color pattern than the first pattern and with the substantial amount of white space.

An embodiment can further involve: rendering the first pattern and the second pattern at a small size sufficient for the first pattern and the second pattern, and verifying the gloss effect and the fluorescent effect.

In an embodiment the at least one fluorescent ink among the metameric pair of fluorescent inks having the constant pixel high surface can include the first fluorescent ink or the second fluorescent ink.

In an embodiment, the at least one other fluorescent ink among the metameric pair of fluorescent inks with the substantial amount of white space can include the first fluorescent ink or the second fluorescent ink.

An embodiment can further involve verifying the security mark by viewing the security mark as a single color/pattern under non ultra-violet light without tilting.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an embodiment" or "in an example embodiment" and variations thereof as utilized herein may not necessarily refer to the same embodiment, and the phrase "in another embodiment" or "in another example embodiment" or "in an alternative embodiment" and variations thereof as utilized herein may or may not necessarily refer to a different embodiment. It is intended, for example, that the claimed subject matter can include combinations of embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" may refer to "one or more", the term "at least two" may refer to "two or more" and so on.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

In the area of security printing, documents can be protected from copying, forging and counterfeiting using multiple techniques. Specialty imaging is one such method of security printing, which can use standard material such as papers inks and toners. Typically, security-printing companies in the marketplace require special (expensive) materials. An example document is a prescription where a pharmacist would like to be able to have a satisfactory level of confidence that the document is genuine.

Figure 1:
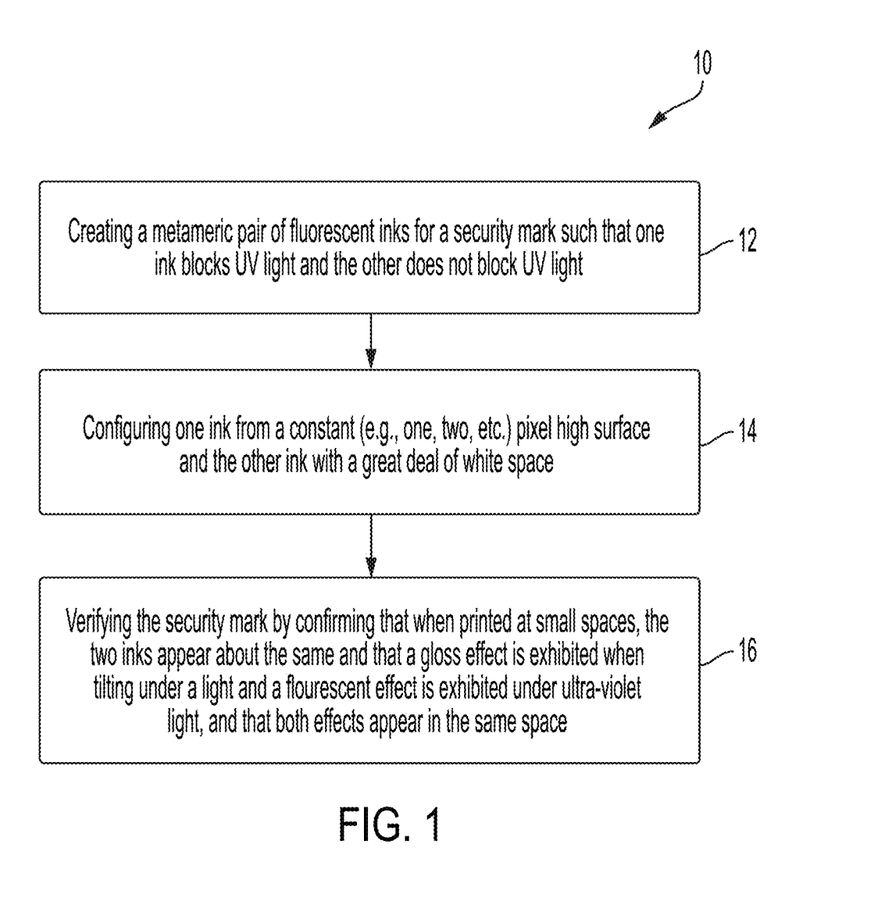
FIG. 1 illustrates a flow chart of operations illustrating logical operational steps of a method for creating, rendering and verifying a dual gloss effect and a fluorescent effect in the same space for a security document, in accordance with an embodiment.

FIG. 1 illustrates a flow chart of operations illustrating logical operational steps of a method 10 for creating, rendering and verifying a dual gloss effect and a fluorescent effect in the same space for a security document, in accordance with an embodiment. The method 10 can be implemented as a specialty imaging technique for creating and rendering security-printing effects such as a dual gloss effect and a fluorescent effect. The method 10 shown in FIG. 1 can be used for rendering a security mark on a recording medium.

As shown at block 12, a step or operation can be implemented for creating a metameric pair of fluorescent inks with a first fluorescent ink among the metameric pair of fluorescent inks that blocks UV light and a second fluorescent ink among the metameric pair of fluorescent inks that does not block UV light. Next, as shown at block 14, a step or operation can be implemented for configuring at least one fluorescent ink among the metameric pair of fluorescent inks with a first pattern based on a constant pixel high surface and at least one other fluorescent ink among the metameric pair of fluorescent inks with a second pattern based on a large amount of white space. The operation shown at block 14 can involve an operation in which the security mark can be defined for rendering on a recording medium (e.g., a paper document, cardboard, textile, etc) with the metameric pair of fluorescent inks and based on the first pattern and the second pattern.

Next, as shown at block 16, a step or operation can be implemented for verifying the security mark by confirming that when printed at small spaces, the two inks appear about the same and that a gloss effect is exhibited when tilting under a light and a fluorescent effect is exhibited under ultra-violet light, and that both effects appear in the same space.

The method 10 shown in FIG. 1 thus involves steps or operations in which a metameric pair of florescent inks can be created with one that blocks UV light and the other that does not block UV light. In addition, one ink can be configured from a constant (i.e., one, two, etc.) pixel high surface, while the other preferably possesses a great deal of white space. When printing at small sizes the two inks appear about the same. A gloss effect when tilting under a light and a fluorescent effect occurs under ultra-violet light. Both effects appear in the same space, thereby saving valuable 'real estate' on a recording medium.

Figure 2:
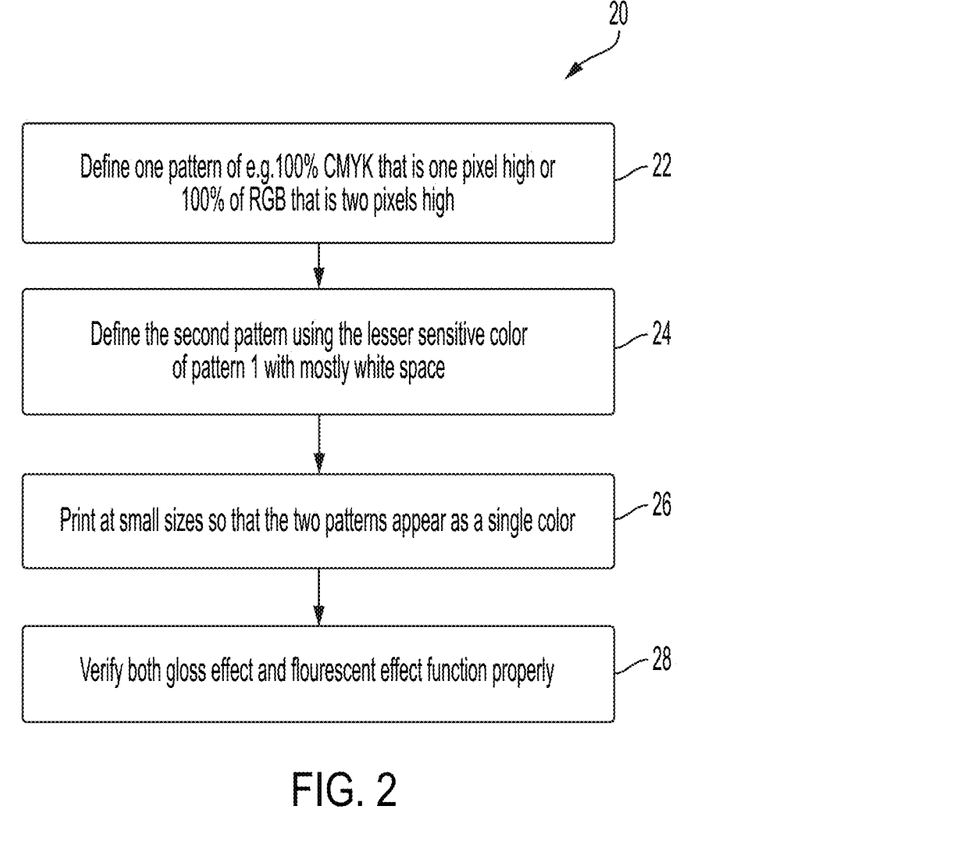
FIG. 2 illustrates a flow chart of operations illustrating logical operational steps of a method for creating, rendering and verifying a dual gloss effect and a fluorescent effect in the same space for a security document, in accordance with an alternative embodiment.

FIG. 2 illustrates a flow chart of operations illustrating logical operational steps of a method 20 for creating, rendering and verifying a dual gloss effect and a fluorescent effect in the same space for a security document, in accordance with an alternative embodiment. The method 20 can be implemented as a specialty imaging technique for creating and rendering security-printing effects such as a dual gloss effect and a fluorescent effect. The method 20 depicted in FIG. 2 can be used for rendering a security mark on a recording medium.

As shown at block 22, a step or operation can be implemented to define one pattern of e.g. 100% CMYK that is one pixel high or 100% of RGB that is two pixels high. Next, as shown at block 24, a step or operation can be implemented to define the second pattern using the lesser sensitive color of the first pattern with mostly white space. Thereafter, as depicted at block 26, a step or operation can be implemented to print at small sizes so that the two patterns appear as a single color. Thereafter, as shown at block 28, a step or operation can be implemented to verify both a gloss effect and fluorescent effect work. Note that no special materials or toner additives are used for this effect.

The operations of method 20 shown in FIG. 2 can be summarized according to steps 1 to step 4 as follows:
1) Define one pattern of e.g. 100% CMYK that is one pixel high or 100% of RGB that is two pixels high
2) Define the second pattern using the lesser sensitive color of pattern 1 with mostly white space
3) Print at small sizes so the two patterns appear as a single color
4) Verify both a gloss effect and fluorescent effect work Note that a design goal of a metameric pair of fluorescent inks is to appear to be about the same color/pattern under office illumination while text and/or graphics become visible under UV illumination. A design goal of a gloss effect is to appear to be about the same color/pattern at one angle under illumination while text and/or graphics appear at a different angle.

Figure 3:
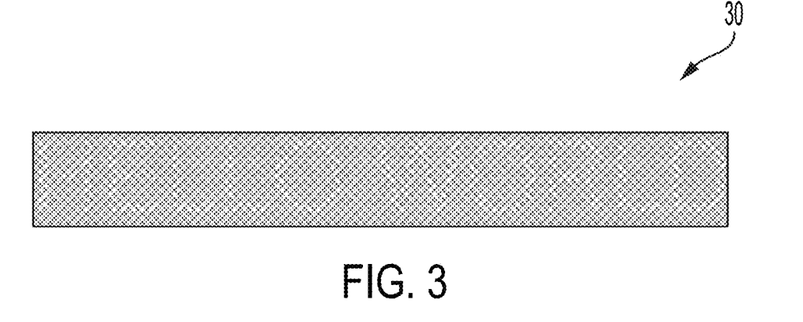
FIG. 3 illustrates an image of a rendered sample, in accordance with an embodiment.

FIG. 3 illustrates an image of a rendered sample 30, in accordance with an embodiment. Following method 10 or method 20 can render the sample 30. The sample 30 can be used as a security mark that can be rendered on a recording medium such as a document. The example shown in FIG. 3 exhibits the words "HELLO WORLD". Note that FIG. 3 is zoomed to show detail including the fact that at small sizes the words "HELLO WORLD" are not seen.

Figure 4:
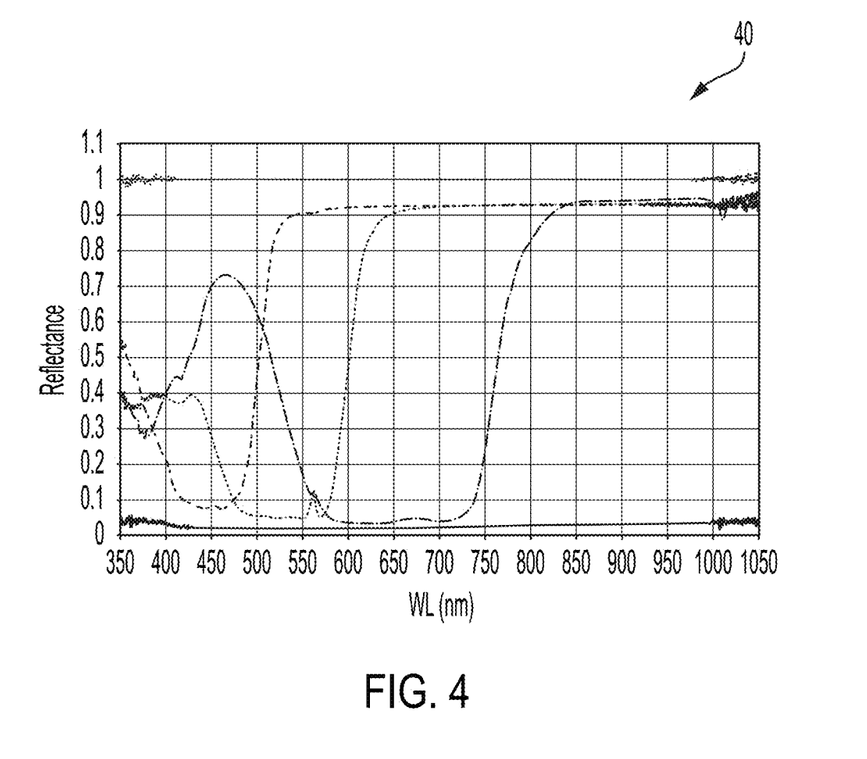
FIG. 4 illustrates a graph depicting data indicative of the spectral reflectance for different toners, in accordance with an embodiment.

FIG. 4 illustrates a graph 40 depicting data indicative of the spectral reflectance for different toners, in accordance with an embodiment. The use of, for example, one-pixel high surface or a two-pixel high surface can result in the production of an improved gloss effect due to the presence of a more consistent surface flatness. A two-pixel high stack also can provide an improved or enhanced UV effect because two pixels can block UV better than one-pixel. The graph 40 shown in FIG. 4 thus demonstrates CMYK spectral reflectance of example toners. The wavelength of many UV flashlights is about 375 nm-400 nm.

Figure 5:
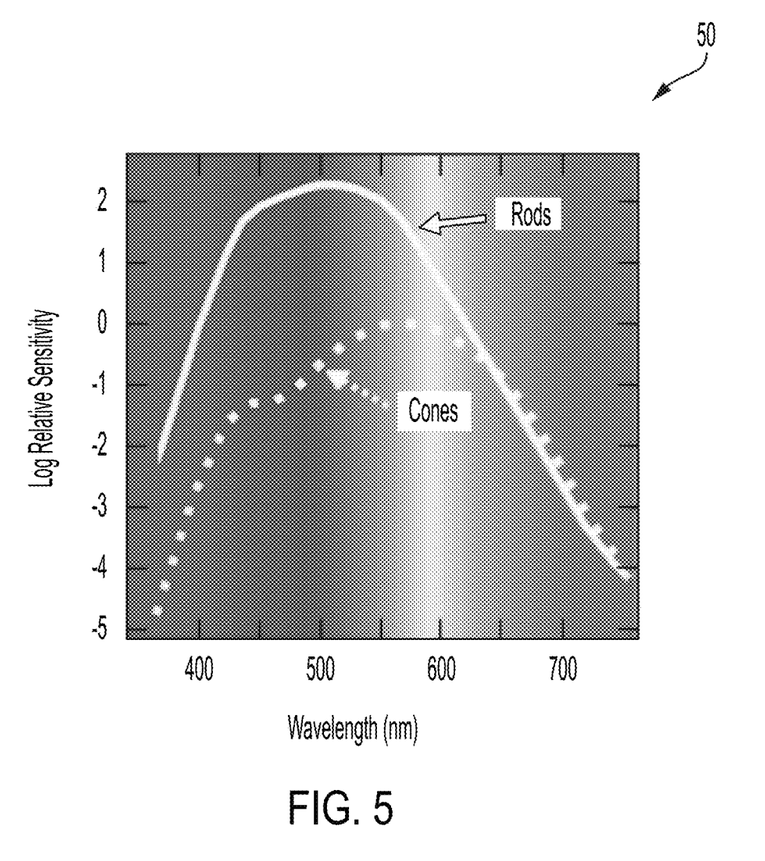
FIG. 5 illustrates a graph depicting data indicative of the spectral sensitivity of cones and rods, in accordance with an embodiment.

FIG. 5 illustrates a graph 50 depicting data indicative of the spectral sensitivity of cones and rods, in accordance with an embodiment. The spectral sensitivity of cones can peak in the yellow-green range as shown in FIG. 5. Thus, in the rendered sample 30 example depicted in FIG. 3 with magenta and yellow, the less sensitive color to chose is magenta. This can allow the magenta/yellow pattern to appear about the same as the white/magenta pattern at small sizes. More white space increases the UV and gloss effects. Note that although color is not shown in the figures herein, it should be appreciated that the original images upon which the disclosed black and white figures are based were rendered originally in color. The original image of the rendered sample 30, for example, included magenta and yellow.

Figure 6:
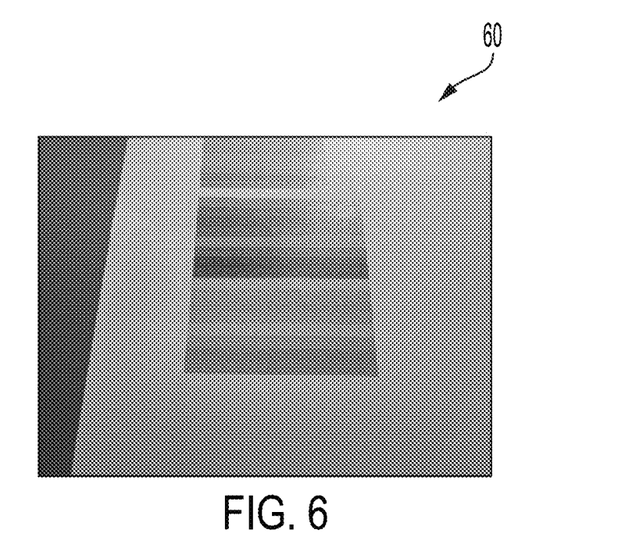
FIG. 6 illustrates an image of a group of security marks under office illumination, in accordance with an embodiment.
Figure 7:
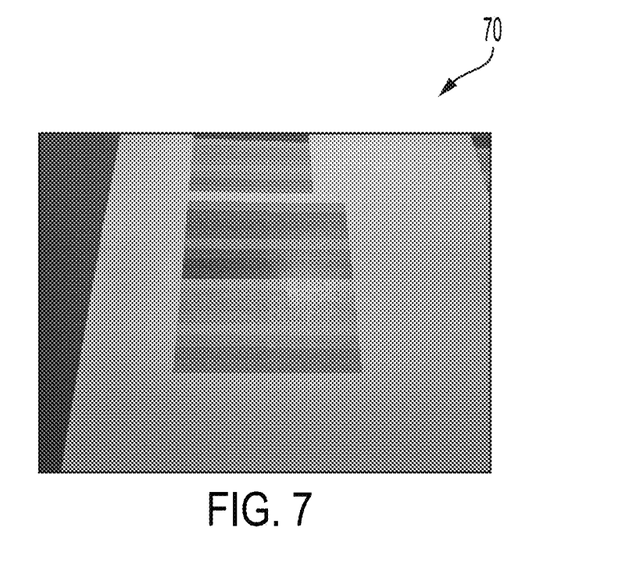
FIG. 7 illustrates an image of the group of security marks shown in FIG. 6 under office illumination at different angles, in accordance with an embodiment.
Figure 8:
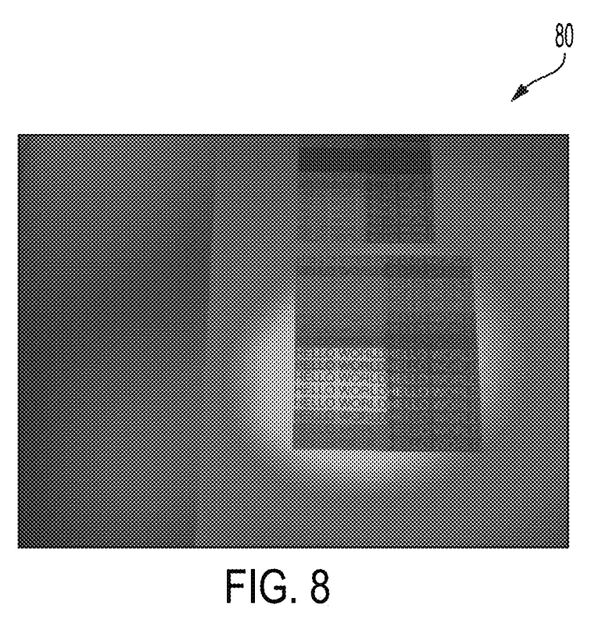
FIG. 8 illustrates an illustrates an image of the group of security marks shown in FIG. 6 and FIG. 7 under ultraviolet (UV) illumination, in accordance with an embodiment.

FIG. 6 illustrates an image 60 of a group of security marks under office illumination, in accordance with an embodiment. FIG. 7 illustrates an image 70 of the group of security marks shown in FIG. 6 under office illumination at different angles, in accordance with an embodiment. FIG. 8 illustrates an illustrates an image 80 of the group of security marks shown in FIG. 6 and FIG. 7 under UV illumination, in accordance with an embodiment.

Note that a tradeoff is that only small sizes may be used for the text to almost disappear without UV light and when viewed straight on under illumination. Experiments have shown that about a 12-point font is the largest that may be used. The image 60 shown in FIG. 6 indicates a sample that is mostly unreadable under office illumination near the bottom/right of the image 60. Towards the top and left the angle between the light and observer has changed and it becomes readable. Image 70 depicted in FIG. 7, on the other hand shows the same sample tilted under an office illumination where the gloss effect is apparent. Image 80 depicted in FIG. 8 shows the same sample under UV illumination where the fluorescent text is clearly visible.

Figure 9:
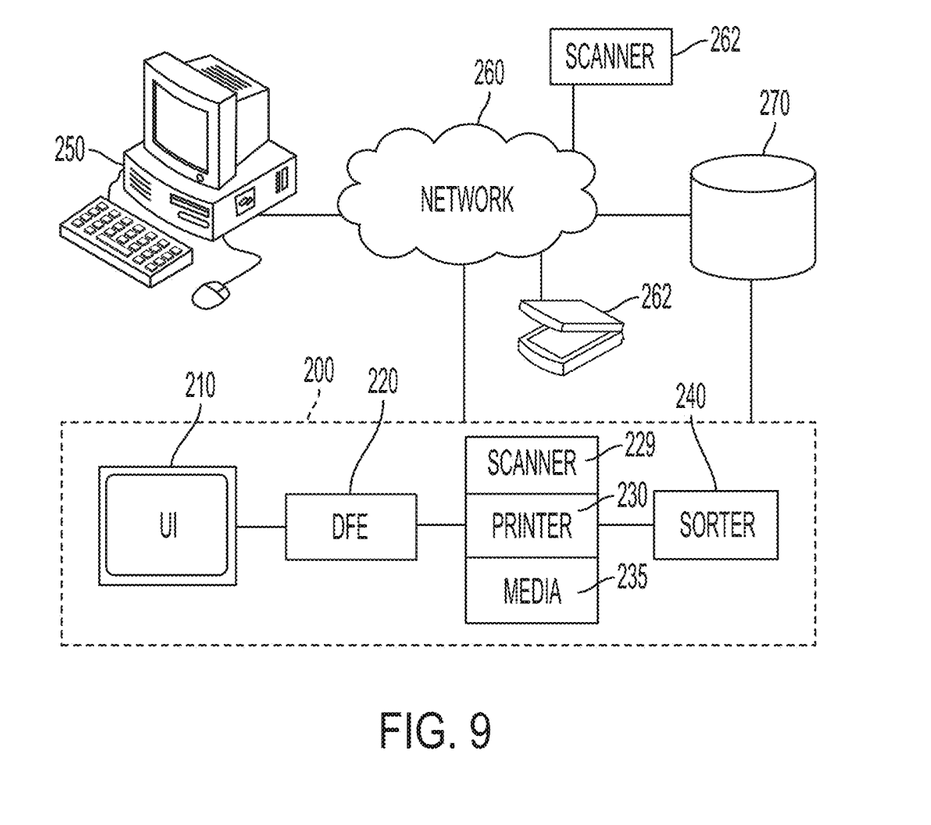
FIG. 9 illustrates a block diagram of a printing system suitable for implementing one or more of the disclosed embodiments.

With reference to FIG. 9, a printing system (or image rendering system) 200 suitable for implementing various aspects of the exemplary embodiments described herein is illustrated. The printing system 200 can implement rendering operations such as scanning a document via a scanner and printing a document via a printer, wherein the document includes the disclosed two-layer correlation mark with a variable data hiding layer.

The printing system 200 can be used to render a security mark on a recording medium by creating a metameric pair of fluorescent inks with a first fluorescent ink among the metameric pair of fluorescent inks that blocks UV light and a second fluorescent ink among the metameric pair of fluorescent inks that does not block UV light, configuring at least one fluorescent ink among the metameric pair of fluorescent inks with a first pattern based on a constant pixel high surface and at least one other fluorescent ink among the metameric pair of fluorescent inks with a second pattern based on a substantial amount of white space, and defining a security mark for rendering on a recording medium with the metameric pair of fluorescent inks and based on the first pattern and the second pattern.

Note that the term 'scanner' as utilized herein can refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 9. For example, the scanner 229 is illustrated in FIG. 9 as a part of the printing system 200. Alternatively, or in addition to the scanner 229 included as a part of the printing system 100, a scanner may be implemented as a separate scanner 262 also depicted in FIG. 9, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose. In some cases, the printing system 200 may function as an apparatus that can render a security mark on a recording medium, according to the instructions and operations discussed herein.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after the print engine 230 has printed a job, in order to manage the arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path.

Figure 10:
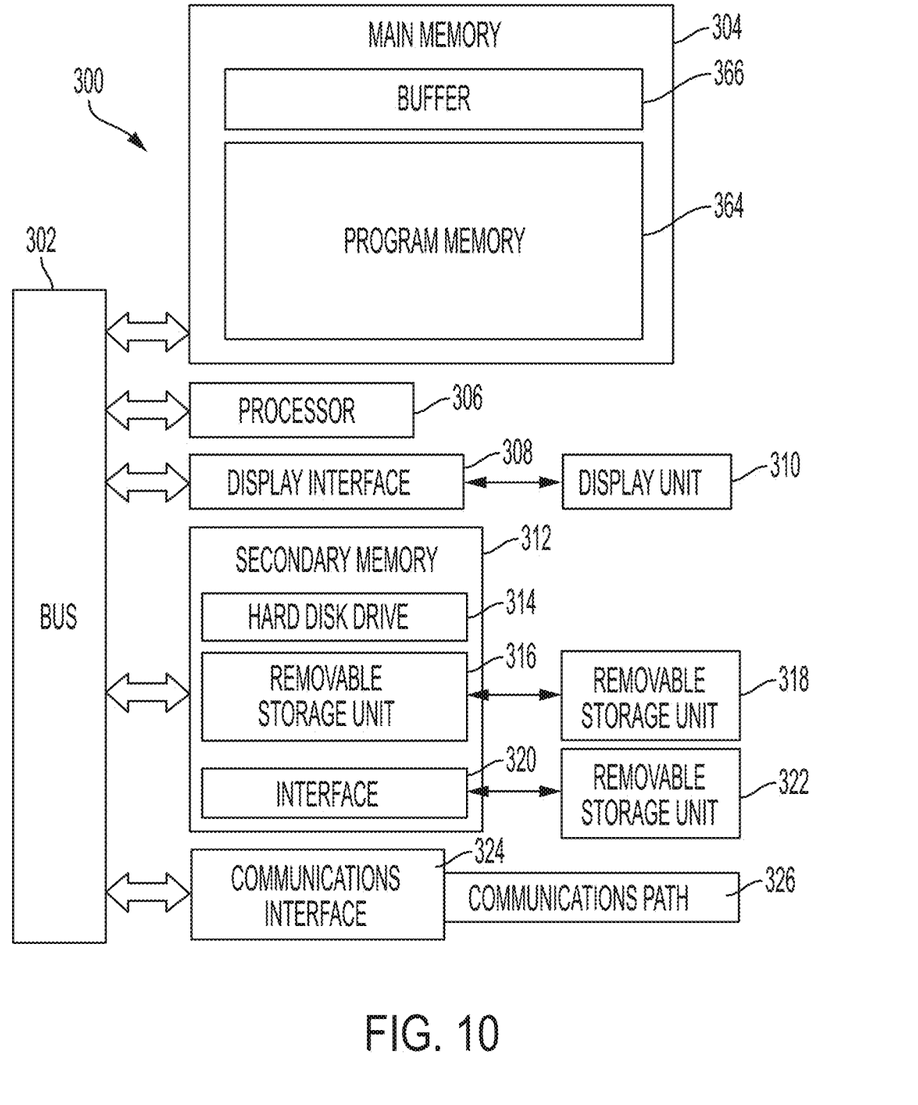
FIG. 10 illustrates a block diagram of a digital front-end controller useful for implementing one or more of the disclosed embodiments.

With respect to FIG. 10, an exemplary DFE (Digital Front End) controller 300 is shown in greater detail. The DFE controller 300 can include one or more processors, such as processor 306 capable of executing machine executable program instructions. The processor 306 can function as a DFE processor.

In the embodiment shown, the processor 306 can be in communication with a bus 302 (e.g., a backplane interface bus, cross-over bar, or data network). The digital front end 300 can also include a main memory 304 that is used to store machine-readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output to allow software and data to be transferred between the digital front-end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded, but may be optionally created inside the DFE in a so-called characterization step.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 7 and/or the DFE controller 300 shown in FIG. 8. A "module" can perform the various steps, operations or instructions discussed herein.

The method 10 shown in FIG. 1 and the method 20 depicted in FIG. 2 may be implemented, in part, in a computer program product comprising a module that may be executed by, for example, DFE controller 220 discussed previously with respect to FIG. 9. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 9).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning.

Figure 11:
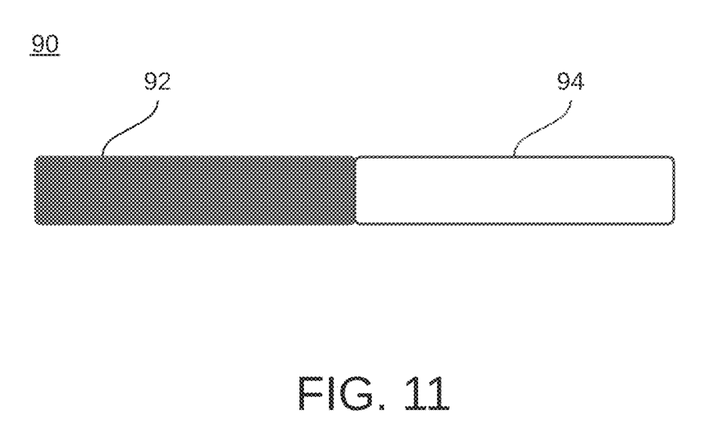
FIG. 11 illustrates a schematic diagram depicting a first fluorescent ink among a metameric pair of fluorescent inks that blocks UV light and a second fluorescent ink among the metameric pair of fluorescent inks that does not block UV light, in accordance with an embodiment.

FIG. 11 illustrates a schematic diagram depicting a first fluorescent ink 92 among a metameric pair 90 of fluorescent inks that blocks UV light and a second fluorescent ink 94 among the metameric pair 90 of fluorescent inks that does not block UV light, in accordance with an embodiment. As discussed herein, at least one (one or more) fluorescent inks among the metameric pair 90 can be configured with a first pattern (first fluorescent ink 92 based on a constant pixel high surface and at least one other fluorescent ink among the metameric pair 90 of fluorescent inks with a second pattern based on a substantial amount of white space (see second fluorescent ink 94).

Based on the foregoing, it can be appreciated that a number of embodiments, including preferred and alternative embodiments, are disclosed herein. For example, in one embodiment, a method for rendering a security mark on a recording medium, can involve: creating a metameric pair of fluorescent inks with a first fluorescent ink among the metameric pair of fluorescent inks that blocks UV light and a second fluorescent ink among the metameric pair of fluorescent inks that does not block UV light, configuring at least one fluorescent ink among the metameric pair of fluorescent inks with a first pattern based on a constant pixel high surface and at least one other fluorescent ink among the metameric pair of fluorescent inks with a second pattern based on a substantial amount of white space, and defining a security mark for rendering on a recording medium with the metameric pair of fluorescent inks and based on the first pattern and the second pattern.

In another embodiment, an apparatus for rendering a security mark on a recording medium, can include: a metameric pair of fluorescent inks created with a first fluorescent ink among the metameric pair of fluorescent inks that blocks UV light and a second fluorescent ink among the metameric pair of fluorescent inks that does not block UV light; at least one fluorescent ink among the metameric pair of fluorescent inks configured with a first pattern based on a constant pixel high surface and at least one other fluorescent ink among the metameric pair of fluorescent inks with a second pattern based on a substantial amount of white space; and a security mark defined for rendering on a recording medium with the metameric pair of fluorescent inks and based on the first pattern and the second pattern.

In yet another embodiment, a system for rendering a security mark on a recording medium, can include at least one processor and a non-transitory computer-usable medium embodying computer program code, the computer-usable medium capable of communicating with the at least one processor, the computer program code comprising instructions executable by the at least one processor and configured for: creating a metameric pair of fluorescent inks with a first fluorescent ink among the metameric pair of fluorescent inks that blocks UV light and a second fluorescent ink among the metameric pair of fluorescent inks that does not block UV light; configuring at least one fluorescent ink among the metameric pair of fluorescent inks with a first pattern based on a constant pixel high surface and at least one other fluorescent ink among the metameric pair of fluorescent inks with a second pattern based on a substantial amount of white space; and defining a security mark for rendering on a recording medium with the metameric pair of fluorescent inks and based on the first pattern and the second pattern.

An embodiment can further involve verifying the security mark by confirming that the security mark: exhibits a gloss effect when subject to tilting under a non ultra-violet light; exhibits a fluorescent effect under an ultra-violet light; and exhibits the gloss effect and the fluorescent effect in a same space.

An embodiment can further involve: defining the first pattern based on the constant pixel high surface by defining the first pattern based on a percentage of CMYK that is one pixel high or defining the first pattern based on the pixel high surface that is a percentage of RGB that is two pixels high, and defining the second pattern using a lesser sensitive color pattern than the first pattern and with the substantial amount of white space.

An embodiment can further involve: rendering the first pattern and the second pattern at a small size sufficient for the first pattern and the second pattern, and verifying the gloss effect and the fluorescent effect.

In an embodiment the at least one fluorescent ink among the metameric pair of fluorescent inks having the constant pixel high surface can include the first fluorescent ink or the second fluorescent ink.

In an embodiment, the at least one other fluorescent ink among the metameric pair of fluorescent inks with the substantial amount of white space can include the first fluorescent ink or the second fluorescent ink.

An embodiment can further involve verifying the security mark by viewing the security mark as a single color/pattern under non ultra-violet light without tilting.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a security mark on a recording medium, comprising:
    creating a metameric pair of fluorescent inks with a first fluorescent ink among the metameric pair of fluorescent inks that blocks UV light and a second fluorescent ink among the metameric pair of fluorescent inks that does not block UV light;
    configuring at least one fluorescent ink among the metameric pair of fluorescent inks with a first pattern based on a constant pixel high surface and at least one other fluorescent ink among the metameric pair of fluorescent inks with a second pattern based on a substantial amount of white space; and
    defining a security mark for rendering on a recording medium with the metameric pair of fluorescent inks and based on the first pattern and the second pattern.

2. The method of claim 1 further comprising verifying the security mark by confirming that the security mark:
    exhibits a gloss effect when subject to tilting under a non ultra-violet light;
    exhibits a fluorescent effect under an ultra-violet light; and
    exhibits the gloss effect and the fluorescent effect in a same space.

3. The method of claim 1 further comprising:
    defining the first pattern based on the constant pixel high surface by defining the first pattern based on a percentage of CMYK that is one pixel high or defining the first pattern based on the pixel high surface that is a percentage of RGB that is two pixels high;

defining the second pattern using a lesser sensitive color pattern than the first pattern and with the substantial amount of white space.

4. The method of claim 3 further comprising:
rendering the first pattern and the second pattern at a small size sufficient for the first pattern and the second pattern; and
verifying the gloss effect and the fluorescent effect.

5. The method of claim 1 wherein the at least one fluorescent ink among the metameric pair of fluorescent inks having the constant pixel high surface comprises the first fluorescent ink or the second fluorescent ink.

6. The method of claim 1 wherein the at least one other fluorescent ink among the metameric pair of fluorescent inks with the substantial amount of white space comprises the first fluorescent ink or the second fluorescent ink.

7. The method of claim 1 wherein:
the at least one fluorescent ink among the metameric pair of fluorescent inks having the constant pixel high surface comprises the first fluorescent ink or the second fluorescent ink; and
the at least one other fluorescent ink among the metameric pair of fluorescent inks with the substantial amount of white space comprises the first fluorescent ink or the second fluorescent ink.

8. The method of claim 1 further comprising verifying the security mark by viewing the security mark as a single color/pattern under non ultra-violet light without tilting.

9. An apparatus for rendering a security mark on a recording medium, comprising:
a metameric pair of fluorescent inks created with a first fluorescent ink among the metameric pair of fluorescent inks that blocks UV light and a second fluorescent ink among the metameric pair of fluorescent inks that does not block UV light;
at least one fluorescent ink among the metameric pair of fluorescent inks configured with a first pattern based on a constant pixel high surface and at least one other fluorescent ink among the metameric pair of fluorescent inks with a second pattern based on a substantial amount of white space; and
a security mark defined for rendering on a recording medium with the metameric pair of fluorescent inks and based on the first pattern and the second pattern.

10. The apparatus of claim 9 wherein the security mark is verifiable by confirming that the security mark:
exhibits a gloss effect when subject to tilting under a non ultra-violet light; exhibits a fluorescent effect under an ultra-violet light; and
exhibits the gloss effect and the fluorescent effect in a same space.

11. The apparatus of claim 9 wherein:
the first pattern is defined based on the constant pixel high surface by defining the first pattern based on a percentage of CMYK that is one pixel high or defining the first pattern based on the pixel high surface that is a percentage of RGB that is two pixels high;
the second pattern is defined using a lesser sensitive color pattern than the first pattern and with the substantial amount of white space.

12. The apparatus of claim 11 wherein:
the first pattern and the second pattern are rendered at a small size sufficient for the first pattern and the second pattern; and
the gloss effect and the fluorescent effect are verified.

13. The apparatus of claim 9 wherein the at least one fluorescent ink among the metameric pair of fluorescent inks having the constant pixel high surface comprises the first fluorescent ink or the second fluorescent ink.

14. The apparatus of claim 9 wherein the at least one other fluorescent ink among the metameric pair of fluorescent inks with the substantial amount of white space comprises the first fluorescent ink or the second fluorescent ink.

15. The apparatus of claim 9 wherein:
the at least one fluorescent ink among the metameric pair of fluorescent inks having the constant pixel high surface comprises the first fluorescent ink or the second fluorescent ink; and
the at least one other fluorescent ink among the metameric pair of fluorescent inks with the substantial amount of white space comprises the first fluorescent ink or the second fluorescent ink.

16. The apparatus of claim 9 wherein the security mark is verifiable by viewing the security mark as a single color/pattern under non ultra-violet light without tilting.

17. A system for rendering a security mark on a recording medium, comprising:
at least one processor; and
a non-transitory computer-usable medium embodying computer program code, the computer-usable medium capable of communicating with the at least one processor, the computer program code comprising instructions executable by the at least one processor and configured for:
creating a metameric pair of fluorescent inks with a first fluorescent ink among the metameric pair of fluorescent inks that blocks UV light and a second fluorescent ink among the metameric pair of fluorescent inks that does not block UV light;
configuring at least one fluorescent ink among the metameric pair of fluorescent inks with a first pattern based on a constant pixel high surface and at least one other fluorescent ink among the metameric pair of fluorescent inks with a second pattern based on a substantial amount of white space; and
defining a security mark for rendering on a recording medium with the metameric pair of fluorescent inks and based on the first pattern and the second pattern.

18. The system of claim 17 wherein the instructions are further configured for verifying the security mark by confirming that the security mark:
exhibits a gloss effect when subject to tilting under a non ultra-violet light; exhibits a fluorescent effect under an ultra-violet light; and exhibits the gloss effect and the fluorescent effect in a same space.

19. The system of claim 17 wherein the instructions are further configured for:
defining the first pattern based on the constant pixel high surface by defining the first pattern based on a percentage of CMYK that is one pixel high or defining the first pattern based on the pixel high surface that is a percentage of RGB that is two pixels high;
defining the second pattern using a lesser sensitive color pattern than the first pattern and with the substantial amount of white space.

20. The system of claim 17 wherein the instructions are further configured for:
rendering the first pattern and the second pattern at a small size sufficient for the first pattern and the second pattern; and
verifying the gloss effect and the fluorescent effect.

* * * * *